UNITED STATES PATENT OFFICE.

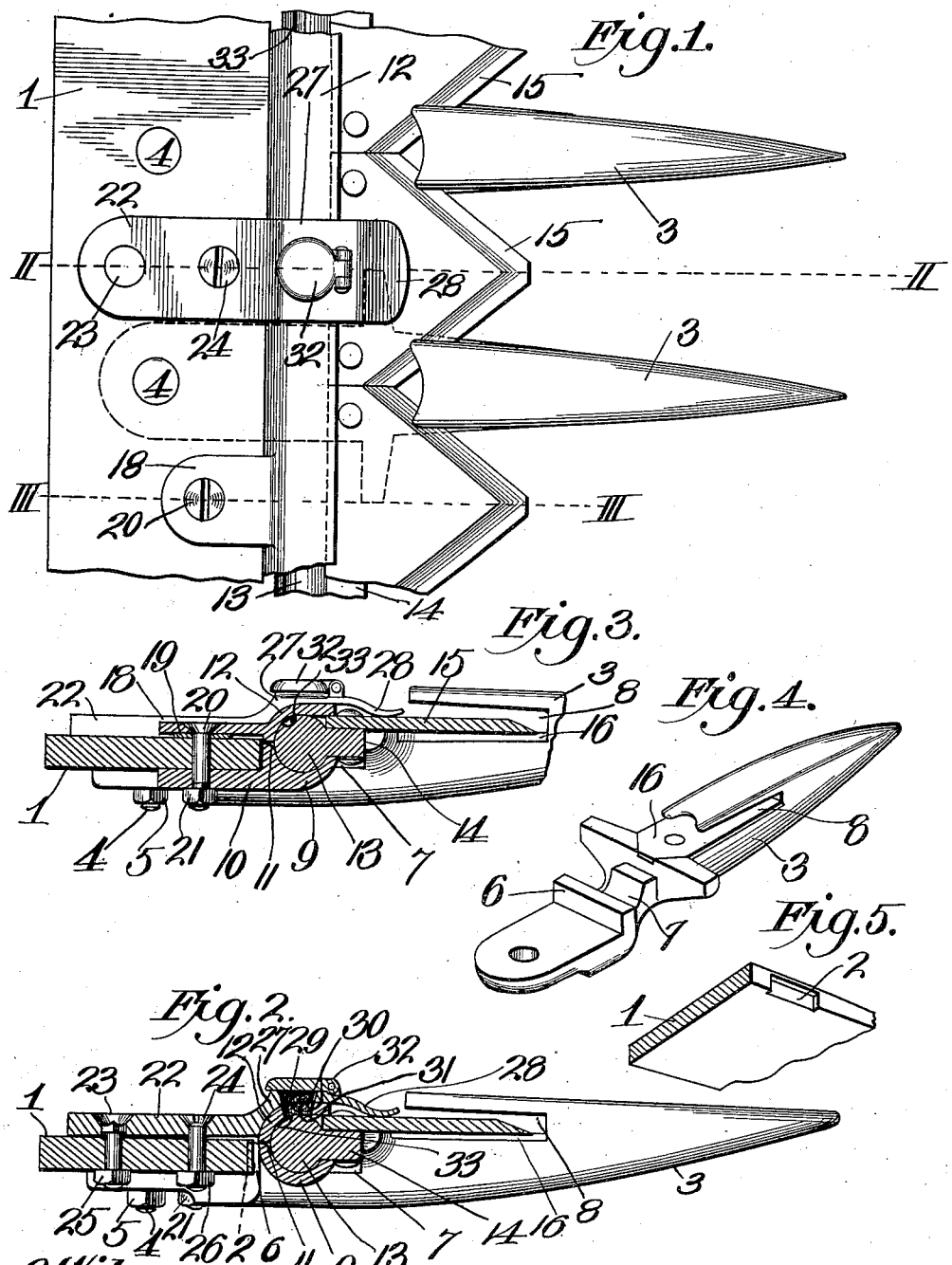

LOU O. FERBRACHE, OF COLUMBUS, MISSOURI.

SICKLE-BAR MECHANISM.

1,083,072.  Specification of Letters Patent.  Patented Dec. 30, 1913.

Application filed December 28, 1912. Serial No. 739,033.

*To all whom it may concern:*

Be it known that I, Lou O. FERBRACHE, a citizen of the United States, residing at Columbus, in the county of Johnson and State of Missouri, have invented certain new and useful Improvements in Sickle-Bar Mechanisms, of which the following is a specification.

This invention relates to sickle bar mechanism, and the primary object is to produce a mechanism of this character having means for holding and supplying lubricant to the sickle bar while in operative position, for the purpose of minimizing wear and insuring efficient operation without the deafening noise and rattle which accompanies the use of an ordinary sickle bar after it has been worn to a considerable extent.

A further object is to produce a construction which can be adjusted to take up wear and thus insure a comparatively snug fit of the sickle bar irrespective of wear in the bearings.

With these general objects in view, the invention consists in certain novel and peculiar features of construction and organization as hereinafter described and claimed; and in order that it may be fully understood reference is to be had to the accompanying drawing, in which—

Figure 1, is a top plan view of a part of a sickle bar mechanism embodying my invention. Fig. 2, is a vertical section on line II—II of Fig. 1. Fig. 3, is a vertical section on line III—III of Fig. 1. Fig. 4, is a detail perspective view of one of the fingers. Fig. 5, is a fragmentary perspective view of a bar forming part of the invention to show one of a series of notches in said bar.

In the said drawing, 1 is the stationary base or supporting bar provided at equidistant points with notches 2, and 3 are the customary fingers underlying bar 1 at their rear ends and secured thereto by bolts and nuts 4 and 5, respectively. Each finger is provided with an upwardly projecting rib 6 fitting in one of the notches 2 of bar 1, the engagement of the ribs with the notches enabling each finger to be held reliably in position by a single bolt and nut. Each finger is formed in its upper side with the customary transverse channel 7, and is bifurcated as usual as at 8.

A boxing extending longitudinally of the bar 1, is constructed as follows; 9 is a gutter-shaped bearing lying in the channels or grooves 7 of the fingers, and provided with a plurality of rearwardly projecting arms 10, underlying bar 1, the upper edge of said gutter-shaped bearing being beveled downwardly and forwardly as at 11, for a purpose which hereinafter appears. The upper member 12 of the bearing is of segmental form and overlies the lower member and conjointly therewith forms a bearing for a cylindrical reciprocatory sickle bar 13 provided with a longitudinal rib 14 projecting forwardly beyond the front margin of the members 9 and 12 of the bearing, the front edge of the last-named member overlapping the rear edges of the cutting teeth 15, of the sickle bar, said teeth as usual being adapted to operate through the bifurcations 8 of the fingers and in conjunction with the stationary blades 16 set in the fingers in the customary manner as shown. The rear edge of the upper member of the boxing or bearing rests on the beveled edge of bearing 9, and in a plane above said edge is provided with rearwardly projecting arms 18 corresponding in number to and lying in the same vertical plane as the arms 10 of the lower member, and said arms 18 overlie and are spaced from bar 1 by washers 19. Extending through said arms, washers and bar 1, are securing bolts 20 engaged at their lower ends by clamping nuts 21, it being understood that the upper member of the bearing or boxing is capable of being sprung downward slightly so as to take up wear, and that in this downward adjustment, its rear edge fulcrums slightly on the rear edge of member 9, the beveling of the latter permitting the member 12 to have a slight rocking movement. This beveling also serves another purpose, namely it provides in conjunction with the bar 13, a shallow magazine for the full length of said bar wherein oil may collect in the event it flows downward around the rear side of bar 13 more rapidly than it is enabled to work its way down under the said bar 13.

To clamp the upper member of the bearing or boxing firmly down upon the bar 13, a series of clamp plates 22, preferably three or four in number, are secured to bar 1 by bolts 23 and 24 and nuts 25 and 26, respectively. These clamp plates have arched portions 27 overlying and fitting snugly upon the upper member 12 of the bearing or boxing, and terminating in spring terminals 28 which bear upon the sickle teeth to hold the same down upon the stationary plate 16, and when it is desired to take up wear in the bearing or boxing, the nuts 26 are screwed farther upon the bolts 24 and thus draw the front ends of the plates 22 downward and incidentally spring the upper bearing downward until it fits snugly upon the sickle bar 13.

Each bearing plate 22 is provided vertically above the bar 13 with an opening 29 registering with an opening 30 in the member 12, these registering openings constituting magazines for holding a considerable quantity of lubricating oil or a packing 31 saturated with lubricating oil and to exclude dust and grit from the openings 29, caps 32 are employed, the same being hinged or otherwise secured to the clamping plates. From the foregoing it will be apparent that the sickle bar can be kept properly lubricated.

If desired the bar 13 may be provided with a longitudinal groove 33 connecting the different holes 30 so that lubricant may be distributed for the full length of the bearing, it being obvious that with a member 12 of from five to six feet in length, with three or four holes 30, the reciprocatory movement of the sickle bar would be insufficient to effect distribution of lubricant from each hole or opening half way to the adjacent hole or opening, as the length of the stroke of the sickle bar falls materially short of the distance between adjacent clamping plates 22.

From the above description it will be apparent that I have produced a sickle bar mechanism possessing the features of advantage enumerated as desirable and I wish it to be understood that while I have illustrated and described the preferred embodiment of the invention, I reserve the right to make all changes properly falling within the spirit and scope of the invention as defined in the appended claims.

I claim:—

1. A sickle bar mechanism, comprising a bar, fingers projecting forwardly therefrom and provided adjacent the front edge of the bar with alined transverse grooves, a boxing consisting of a lower or gutter-shaped member extending through the grooves of the fingers, and an upper member of segmental form overlying the lower or gutter-shaped member, means for securing the two members of the boxing to the said bar, a cylindrical sickle bar extending parallel with the first-named bar and fitting snugly in the boxing, cutting blades secured to the reciprocatory bar and clamp plates secured to the first-named bar and bearing upon the upper member of the boxing.

2. A sickle bar mechanism, comprising a bar, fingers projecting forwardly therefrom and provided adjacent the front edge of the bar with alined transverse grooves, a boxing consisting of a lower or gutter-shaped member extending through the grooves of the fingers, and an upper member of segmental form overlying the lower or gutter-shaped member, means for securing the two members of the boxing to the said bar, a cylindrical sickle bar extending parallel with the first-named bar and fitting snugly in the boxing, cutting blades secured to the reciprocatory bar and clamp plates secured to the first-named bar and bearing upon the upper member of the boxing and provided with spring tongues projecting forward and engaging the blades.

3. A sickle bar mechanism, comprising a bar, fingers projecting forwardly therefrom and provided adjacent the front edge of the bar with alined transverse grooves, a boxing consisting of a lower or gutter-shaped member extending through the grooves of the fingers, and an upper member of segmental form overlying the lower or gutter shaped member, means for securing the two members of the boxing to the said bar, a cylindrical sickle bar extending parallel with the first-named bar and fitting snugly in the boxing, cutting blades secured to the reciprocatory bar, and clamp plates secured to the first-named bar and bearing upon the upper member of the boxing; said clamping plates and upper member of the boxing having registering lubricant-receiving openings to feed lubricant into the boxing.

4. A sickle bar mechanism, comprising a bar, fingers projecting forwardly therefrom and provided adjacent the front edge of the bar with alined transverse grooves, a boxing consisting of a lower or gutter-shaped member extending through the grooves of the fingers, and an upper member of segmental form overlying the lower or gutter-shaped member, means for securing the two members of the boxing to the said bar, a cylindrical sickle bar extending parallel with the first-named bar and fitting snugly in the boxing, cutting blades secured to the reciprocatory bar, clamp plates secured to the first-named bar and bearing upon the upper member of the boxing; said clamping plates and upper member of the boxing having registering lubricant-receiving openings to feed lubricant into the boxing, and covers for said openings carried by said clamp plates.

5. A sickle bar mechanism, comprising a bar, fingers projecting forwardly therefrom and provided adjacent the front edge of the bar with alined transverse grooves, a boxing consisting of a lower or gutter-shaped member extending through the grooves of the fingers, and an upper member of segmental form overlying the lower or gutter-shaped member, means for securing the two members of the boxing to the said bar, a cylindrical sickle bar extending parallel with the first-named bar and fitting snugly in the boxing, cutting blades secured to the reciprocatory bar, clamp plates secured to the first-named bar and bearing upon the upper member of the boxing; said clamping plates and upper member of the boxing having registering lubricant-receiving openings to feed lubricant into the boxing; said sickle bar having a longitudinal groove communicating with said openings, and located rearward of the vertical plane of the axis of the sickle bar.

6. A sickle bar mechanism, comprising a bar, fingers projecting forward from said bar and provided near the front margin thereof with alined transverse channels, a boxing comprising upper and lower members, of segmental form in cross section, the lower or gutter-shaped member having its upper rear edge beveled downwardly and inwardly and the upper member having its rear edge resting on the beveled edge of the lower member, arms projecting from said members at the under and upper sides of said bar, washers interposed between the bar and the said upper arms, bolts extending through said arms, washers and bar to clamp said parts firmly together, clamp plates upon and bolted to said bar and resting at their front ends upon the upper member, said member and said clamp plates having registering openings for supplying lubricant to the interior of the boxing, a cylindrical sickle bar arranged to reciprocate in said boxing, and cutting blades secured to and projecting forwardly from said sickle bar.

In testimony whereof I affix my signature, in the presence of two witnesses.

LOU O. FERBRACHE.

Witnesses:
 JOHN GILLILAN,
 WILLIAM S. WAKEMAN.

Copies of this patent may be obtained for five cents each, by addressing the "Commissioner of Patents, Washington, D. C."